(12) United States Patent
Kumar et al.

(10) Patent No.: US 11,711,227 B1
(45) Date of Patent: Jul. 25, 2023

(54) MEETING ASSISTANT

(71) Applicant: Dell Products L.P., Round Rock, TX (US)

(72) Inventors: Dhilip Kumar, Bangalore (IN); Vidhyanshu Jain, Jabalpur (IN)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 17/648,027

(22) Filed: Jan. 14, 2022

(51) Int. Cl.
| | |
|---|---|
| *H04L 12/18* | (2006.01) |
| *G06Q 10/10* | (2023.01) |
| *G06N 3/02* | (2006.01) |
| *G06N 5/00* | (2023.01) |
| *G06Q 10/1093* | (2023.01) |
| *G06N 5/01* | (2023.01) |

(52) U.S. Cl.
CPC .......... *H04L 12/1818* (2013.01); *G06N 3/02* (2013.01); *G06N 5/01* (2023.01); *G06Q 10/1095* (2013.01); *H04L 12/1822* (2013.01)

(58) Field of Classification Search
CPC ... H04L 12/1818; H04L 12/1822; G06N 5/01; G06N 3/02; G06Q 10/1095
See application file for complete search history.

(56) References Cited

U.S. PATENT DOCUMENTS 10,489,462 B1 *  11/2019  Rogynskyy ........... G06F 16/288
2022/0383265 A1 *  12/2022  Dhumal ................ G06F 40/216

* cited by examiner

*Primary Examiner* — Nazia Naoreen
(74) *Attorney, Agent, or Firm* — Daly, Crowley Mofford & Durkee, LLP

(57) ABSTRACT

A method for use in a computing device, comprising: receiving an invite for a communications session; obtaining context information associated with the invite; generating a signature for the invite based on the context information; generating an attendance score for the invite by evaluating a neural network based on the signature for the invite, the attendance score being an estimate of a degree of importance of attending the communications session; generating a response to the invite based on the attendance score, the response indicating whether a user of the computing device accepts or rejects the invite; and transmitting the response to a sender of the invite.

20 Claims, 7 Drawing Sheets

500

502 → INVITE ID: 0001
503 → DATE AND TIME: 11/19/2021 AT 5:00 P.M EST
504 → APPLICATION: ZOOM TM.
506 → MEETING MODALITY: VIDEO + VOICE
508 → MEETING TYPE: TEAM MEETING
510 → MEETING SUBJECT: PLANNING OF YEARLY CONFERENCE
512 → MEETING SENDER: PERSON 2
514 → MEETING ATTENDEES: PERSON 2, PERSON 3, USER

MEETING AGENDA:

516 → DISCUSS BUDGET FOR YEARLY CONFERENCE. DISCUSS INVITATION LIST FOR YEARLY CONFERENCE. DISCUSS ACCOMODATION AND TRAVEL EXPENSES FOR YEARLY CONFERENCE.

518 → CREDENTIALS: PASS_CODE_1
520 → LINK: LINK_1

PROPOSED RESPONSE TO INVITE 0001: *REJECT* ← 604
602

606
SEND

FIG. 6

MEETING ASSISTANT

BACKGROUND

Teleconference calls have many advantages. Teleconference calls allow people to meet and collaborate without having to be present in the same physical location. In addition, teleconference calls can be saved for later viewing. Teleconference calls are used in many organizations to conduct various types of meetings, such as team meetings, project meetings, or leadership meetings.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided for use in a computing device, comprising: receiving an invite for a communications session; obtaining context information associated with the invite; generating a signature for the invite based on the context information; generating an attendance score for the invite by evaluating a neural network based on the signature for the invite, the attendance score being an estimate of a degree of importance of attending the communications session; generating a response to the invite based on the attendance score, the response indicating whether a user of the computing device accepts or rejects the invite; and transmitting the response to a sender of the invite.

According to aspects of the disclosure, a system is provided, comprising: a memory; and at least one processor that is operatively coupled to the memory, the at least one processor being configured to perform the operations of: receiving an invite for a communications session; obtaining context information associated with the invite; generating a signature of the invite based on the context information; generating an attendance score for the invite by evaluating a neural network based on the signature of the invite, the attendance score being an estimate of a degree of importance of attending the communications session; generating a response to the invite based on the attendance score, the response indicating whether a user accepts or rejects the invite; and transmitting the response to a sender of the invite.

According to aspects of the disclosure, a non-transitory computer-readable medium is provided storing one or more processor-executable instructions, which, when executed by at least one processor of a computing device, cause the at least one processor to perform the operations of: receiving an invite for a communications session; obtaining context information associated with the invite; generating a signature of the invite based on the context information; generating an attendance score for the invite by evaluating a neural network based on the signature of the invite, the attendance score being an estimate of a degree of importance of attending the communications session; generating a response to the invite based on the attendance score, the response indicating whether a user of the computing device accepts or rejects the invite; and transmitting the response to a sender of the invite.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 5 is a schematic diagram illustrating examples of context information that may be associated with an invite, according to aspects of the disclosure;

FIG. 6 is a diagram of an example of a user interface for presenting a response to the invite of FIG. 5 according to aspects of the disclosure;

DETAILED DESCRIPTION

Figure 1:
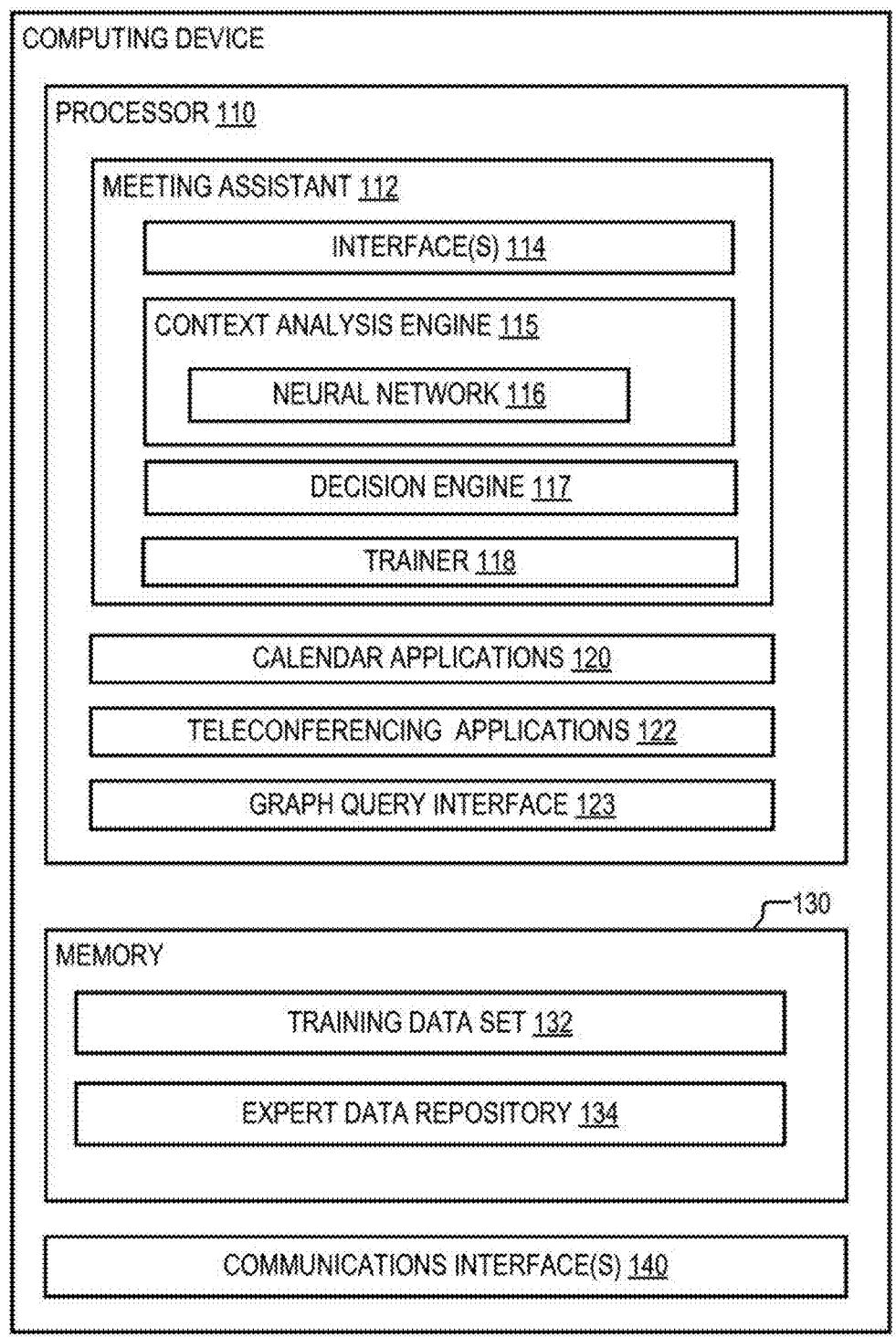
FIG. 1 is a diagram of an example of a computing device, according to aspects of the disclosure.

FIG. 1 is a diagram of an example of a computing device 100. The computing device 100 may include one or more of a laptop computer, a desktop computer, a smartphone, a wearable device, and/or any other suitable type of computing device. The term "user", as used throughout the disclosure, refers to a person who uses the computing device. Typically, the user may be a person under whose name the operating system of the computing device 100 is registered, and who has logged (with his or her personal account information) to various teleconferencing applications or calendar applications that are running on the computing device 100. As is discussed further below, the computing device 100 is provided with a meeting assistant 112, which is configured to provide a centralized solution for processing invites received at various teleconferencing applications that are running on the computing device 100.

The computing device may include a processor 110, a memory 130, and a communications interface 140. The processor 110 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 130 may include any suitable type of volatile and/or non-volatile memory. In some implementations, the memory 130 may include one or more of a random-access memory (RAM), a dynamic random memory (DRAM), a flash memory, a hard drive (HD), a solid-state drive (SSD), a network accessible storage (NAS), and or any other suitable type of memory device. The communications interface 140 may include any suitable type of communications interface, such as one or more Ethernet adapters, one or more Wi-Fi adapters (e.g., 802.1414 adapters), and one or more Long-Term Evolution (LTE) adapters, for example.

The processor 110 may be configured to execute a meeting assistant 116, one or more calendar applications 120, and one or more teleconferencing applications 112. The meeting assistant 116 may include a software application that is configured to perform one or more of the following actions: (i) receive an invite for a teleconference, (ii) automatically generate a response to the invite, (iii) connect to the teleconference automatically, and (iv) send a message to other participants in the conference if the user is running late. In addition, the meeting assistant 112 may be configured to perform a device-agnostic switch between different devices of the user, such as a laptop of the user and a smartphone of the user. The calendar applications 120 may include one or more calendar applications, such as Outlook Calendar TM, Google Calendar TM, and Apple Calendar TM (e.g., see FIG. 2.). The teleconferencing applications 122 may include one or more applications, such as Teams TM, Google Meet TM, Zoom TM and/or any other suitable type of teleconferencing application (e.g., see FIG. 2).

Figure 2:
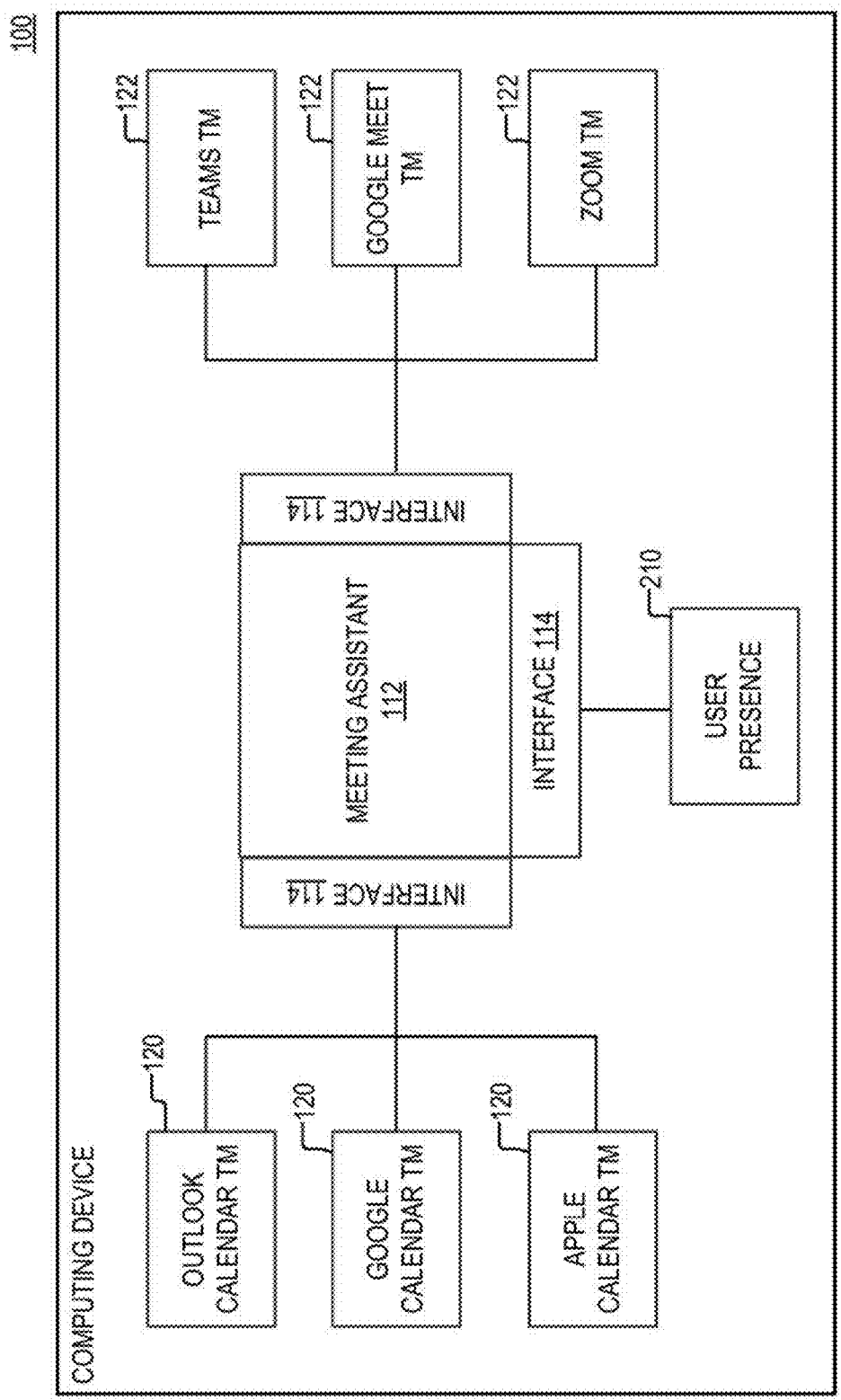
FIG. 2 is a diagram of an example of a computing device, according to aspects of the disclosure.

FIG. 2 depicts an example of one possible implementation of the meeting assistant 112. As illustrated, the meeting assistant 112 may be configured to interface with applications 120 and 122 via interface(s) 114. Furthermore, the meeting assistant 112 may be configured to interact (via the interface(s) 114) with a user presence module 210. The meeting assistant 112 may include a user presence module 210 that is configured to provide the meeting assistant 112 with presence information of the user. The presence information of the user may include one or more of (i) information indicating that the user is available to join a teleconference, (ii) information indicating that the user is not available to join the teleconference, (iii) information indicating that the user is currently participating in another teleconference or engaged in another activity. Although the user presence module 210 is depicted as a discrete block, it will be understood that in some implementations it can be integrated into the meeting assistant 112 or one or more of the teleconferencing or calendar applications. Stated succinctly, the present disclosure is not limited to any specific technique for obtaining presence information for the user.

The meeting assistant 112 may be configured to process invites for conference calls (or any other type of invites) that are received at any of the teleconferencing applications 122 and automatically generate responses to the invites. The response to any particular invite may be generated based on context information that is associated with the invite. The meeting assistant 112 may be configured to execute a context analysis engine 115, a decision engine 117, and a trainer 118. The context analysis engine 115 may be configured to implement a neural network 116. The decision engine 117 may be configured to implement a decision tree 400 (shown in FIG. 4) for determining whether to accept or reject an incoming invite for a teleconference session. The trainer 118 may include logic for generating a training data set 132 and training the neural network 116 based on the training data set 132.

The memory 130 may be configured to store an expert data repository 134 and the training data set 132. In some implementations, the expert data repository 134 may be implemented as a labeled property graph (LPG). In this type of graph, each entity is represented as a node with a uniquely identifiable ID and a set of key-value pairs that characterizes the entity. The relationship between two entities is described as an edge or connection between the nodes. Each of the edges (or relationships) may have a respective ID (to distinguish it from the other edges in the graph), as well as type. Each of the relationships (or edges) may also be associated with one or more respective key-value pairs that describe properties of the edge. Using the LPG provides a robust internal design for representing the entities and the relationships between the entities, and it also helps to store and query information more efficiently.

Alternatively in some implementations, the expert data repository 134 may be implemented by using the resource description framework (RDF). RDF formats may map relationship information as a Triple (subject-predicate-object). For example, an event in which a person sends a teleconference invite may be stored as Subject (Person) →Predicate (Sends)→Object (Meeting/conference). The Subject may be a resource or node/entity in the RDF description. The predicate may represent an edge (or a relationship in the RDF description), and the object may represent another node in the RDF description. The nodes and edges in the RDF description may be identified by a unique resource identifier, and they may lack internal structure.

In some implementations, the information stored in the expert data repository may be obtained by using Natural Language Processing (NLP). The information may be extracted from email messages, chats, voice-to-text channels, etc. In some implementations, some of the relationships indicated by the graph (which is part of the expert data repository 134 (e.g., LPG 300)) may be created depending on interactions between different persons, including receiving and attending meetings/conferences. In some implementations, there may be a schema and/or ontology that identifies some of the entities and relationships and which is used to instantiate the graph, and which is subsequently built upon over a period based on the user's interactions and actions.

In some implementations, processor 110 may be configured to execute a graph query interface 123. The graph query interface 123 may be used by the trainer 118 to retrieve information from the expert data repository 134, which is subsequently used for generating the training data 132. The graph query interface 123 may also be used by the meeting assistant 112 to retrieve the context data for an incoming invite. The graph query interface 123 may be implemented by building a pipeline of traditional natural language processing and machine learning components for prediction and classification tasks. This solution requires a smaller training set, in contrast to Neural Models, which are expensive in terms of time and cost to train the model. This component's goal and the model that realizes this is to take a broad source query and produce a target query expressed in structured language (subgraph query form). For example, the source query "Who is in the meeting/conference?" may be transformed into a subgraph query with nodes representing person, Organization, Suborganization, Mandatory, and all edges representing the relationships between them. These subqueries may be provided to the expert data repository 134, and any information that is returned in response to the sub-queries by the expert data repository 134, may be provided to the sender of the source query (e.g., the trainer 118).

The neural network 116 may be configured to receive a signature of an invite (for a teleconference) and output an attendance score for the invite. The attendance score is an estimate of the degree of importance of attending the teleconference (or other information). In other words, the attendance score may measure how important it is for the user of the computing device 100 to attend the communications session.

The present disclosure is not limited to any specific implementation of the neural network 116. In some implementations, the neural network 116 may be a bi-directional Recurrent Neural Network (RNN) which uses two separate processing sequences (e.g., left-to-right and right-to-left sequences). As RNNs have the tendencies to have to explode or vanishing gradient issues for longer and complex dialogs/messages, the neural network 116 may leverage the specific type of bi-directional RNN called bi-directional RNN with LSTM (Long short-term memory). Additionally or alternatively, in some implementations, the neural network 116 may be a Bi-Directional RNN (Recurrent Neural Network) with LSTM (Long Short-Term Memory).

Figure 3:
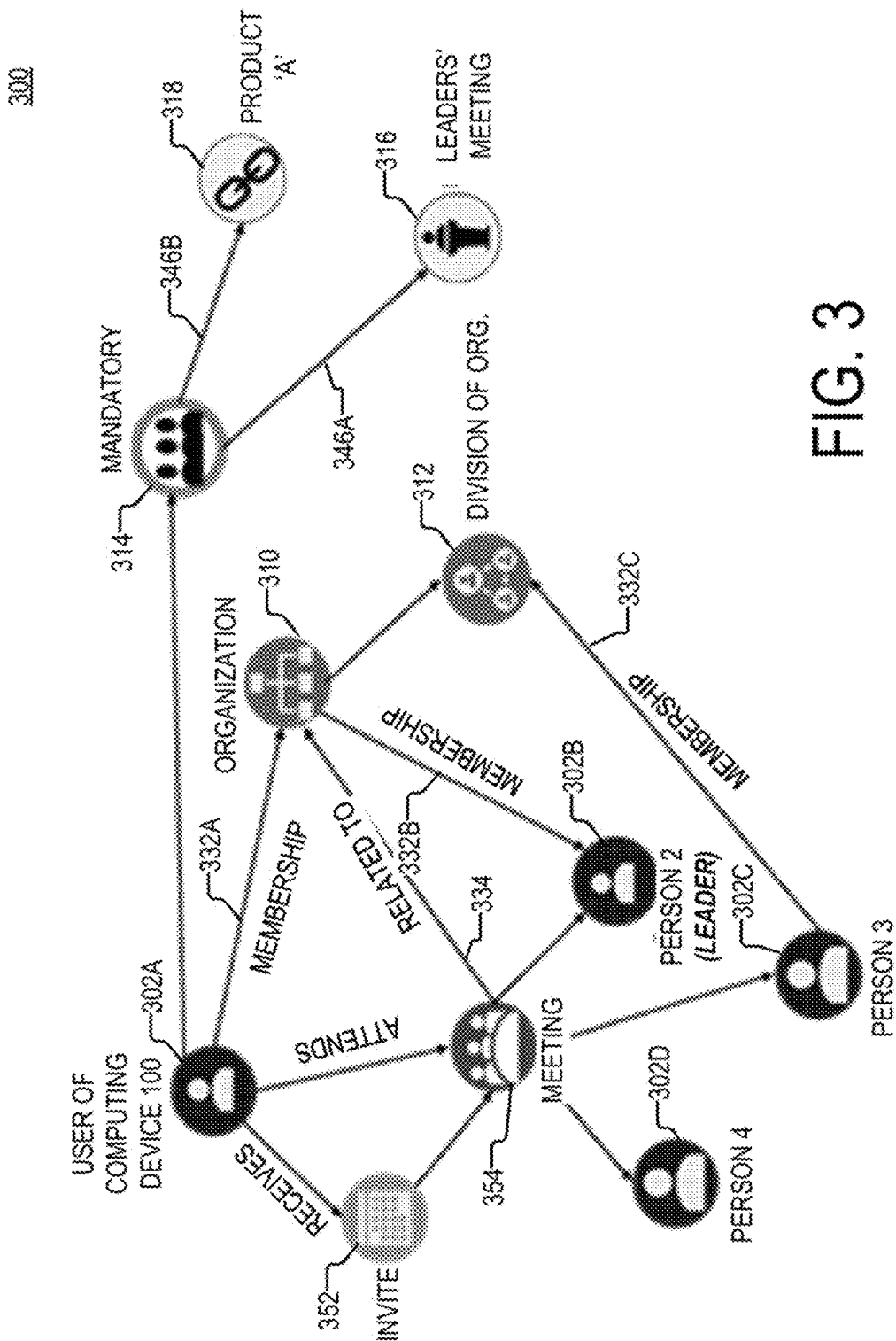
FIG. 3 is a diagram of an example of a graph, according to aspects of the disclosure.

As noted above, the trainer 118 may be configured to generate the training data set 132 and train the neural network 116 based on the training data set 132. More particularly, the trainer 118 may retrieve any of the data that is stored in the expert data repository 134. The retrieved data may include a plurality of data sets. Each data set may be associated with a different teleconference invite which has been presented in the past. Each data set may be the same or similar to the LPG 300, which is shown in FIG. 3. The retrieved data may include text data (e.g., agendas and other information associated with past meetings) or information describing the relationship between entities that are represented by the nodes in the LPG 300. Next, the trainer 118 may pre-process the retrieved data to clean any unwanted characters and stop words. This step will also involve stemming and lemmatization, changing text to lowercase, removing punctuation, etc. Once pre-processing and data cleanup is done, the data may be tokenized. There are many approaches to tokenize these words, including Keras library, NLTK library, etc. In the present example, the Keras Tokenizer class is used to index the tokens. After Tokenization is completed, the tokens may be padded to make them equal length to be used in the model. Next, the generated tokens are output-encoded. Each of the tokens may be generated based on a respective one of the retrieved data sets, and with a respective prior communications session. Next, each of the tokens may be assigned a respective attendance score, which corresponds to the token's respective teleconference. And finally, the token-attendance score pairs may be used to train the neural network 116. Although in the present example the neural network is an RNN, alternative implementations are possible in which the neural network 116 is a feed-forward network and/or any other suitable type of neural network. Stated succinctly the present disclosure is not limited to using any specific type of neural network in the meeting assistant 112.

FIG. 3 shows an example of an LPG 300 that is used for organizing context information for an invite (e.g., a teleconference invite). In some implementations, the invite may be an incoming invite. In such implementations, the context information stored in LPG 300 may be used to generate a signature of the invite, which is subsequently classified with the neural network 116 and used to generate a response to the invite. Alternatively, the invite may be an invite that is received and responded to in the past. In such implementations, the context information stored in LPG 300 may be used to generate training data for training the neural network 116.

The LPG 300 may include an invite node 352 and a meeting node 354. The invite node 352 may represent the invite. The meeting node 354 may represent a meeting, which the teleconference associated with the invite is going to be used to conduct. The meeting node 354 may be used to relate, to the invite node 352, various properties of the participants in the teleconference.

The LPG 300 may include person nodes 302A-D, an organization node 310, and a division node 312. The types of edges represented in the LPG 300 include membership edges 332A-C, and an organization edge 334. According to the present example, node 302A represents the user of the computing device 100; node 302B represents a person who is a "leader" in an organization (hereinafter "Person 2"), node 302C represents another person who is part of the organization (hereinafter "Person 3") and node 303D represents another person (hereinafter "Person 4"). Node 310 represents the organization and node 312 represents a division of the organization. Edge 332A indicates that the user of computing device 100 is part of the organization; edge 332B indicates that Person 2 is part of the organization, and edge 332C indicates that person 3 is part of the division of the organization (which is represented by division node 312).

In some respects, the LPG 300 may identify the structure of the organization (i.e., how the organization is divided into divisions, and how the divisions are divided into sub-divisions, etc.). Furthermore, the LPG 300 may identify the affiliation of persons (who are invited to a teleconference) with different parts of the organization. The persons represented by person nodes 302A-C may be employees of the organization. Although not shown, each of the person nodes 302A-C may be associated with a key-value pair that identifies the position of the person within the company. For example, the key-value pair may indicate whether the person is part of upper management, lower management, etc. In other words, in one aspect, the LPG 300 may be used to put the invite in the context of the standing of the teleconference attendees in an organizational hierarchy.

The LPG 300 may also include an attendance node 314, an attribute node 316, and an attribute node 318. In addition, the LPG 300 may include attendance edges 346A and 346B. Attendance node 314 corresponds to a teleconference attribute, which is indicative of the degree to which the teleconference is mandatory to attend. In the present example, the attendance node 314 corresponds to a teleconference being mandatory to attend. However, alternative implementations are possible in which the attendance node 314 corresponds to a teleconference being optional, etc.

Attribute nodes 316 and 318 correspond to different attributes, which a meeting may possess. Such attributes may include meeting type, meeting subject, and/or any other suitable type of attribute. Attribute node 316 corresponds to a "leaders' meeting" type. A leader's meeting may be a meeting in which at least one member of the upper management of an organization is present. Attribute node 318 corresponds to a subject domain. The subject domain of a meeting may be the subject or topic that is intended to be discussed during the meeting. In the present example, attribute node 318 corresponds to "product A." In the present example, attendance edge 346A connects attribute node 316 to attendance node 314, and attendance edge 346B connects attribute node 318 to attendance node 314.

According to the example of FIG. 3, the graph indicates that some of the invited participants in the meeting are part of the same organization, with one being part of a specific division of the organization. The LPG 300 further indicates that the meeting is a leader's meeting whose subject of discussion is product 'A'. The LPG 300 further indicates that the meeting type and subject suggest that the meeting is mandatory.

In some respects, the inclusion of nodes 314-318 and attendance edges 346A-B enables the LPG 300 to specify how the presence of a particular meeting attribute bears on the meeting being mandatory to attend. However, the inclusion is not necessarily dispositive. As discussed above, the information stored in LPG 300 may be used to generate a signature for the invite (represented by node 352), which is subsequently being used by the neural network 116 to generate an attendance score for the invite. Even though the LPG 300 indicates that the invite possesses attributes that are associated with mandatory meetings, it does not necessarily follow that the attendance score will come in favor of the invite being mandatory. This is so because the neural network 116 takes a holistic approach that takes into consideration a large body of context information for the invite. In situations where hard rules can be applied, the decision engine 117 may still overrule a low attendance score and declare a teleconference/invite mandatory. (E.g., see FIG.4.)

As noted above, the LPG 300 is presented in the context of a single invite. However, in some implementations, when the LPG 300 is used to generate training data, the LPG 300 may include multiple invite nodes that correspond to different invites that were received and responded to in the past. In such implementations, the LPG may provide information about how each of the invite nodes relates to the other entities that are represented in the LPG 300, such as persons, organizations, organization divisions, meeting attributes, attendance attributes, etc. Although in the example of FIG. 3 LPG 300 includes one attendance node, alternative implementations are possible in which the LPG 300 includes a plurality of attendance nodes that correspond to different attendance attributes. Although in the example of FIG. 3 LPG 300 includes one organization, alternative implementations are possible in which the LPG 300 includes a plurality of attendance nodes that correspond to different organizations.

Figure 4:
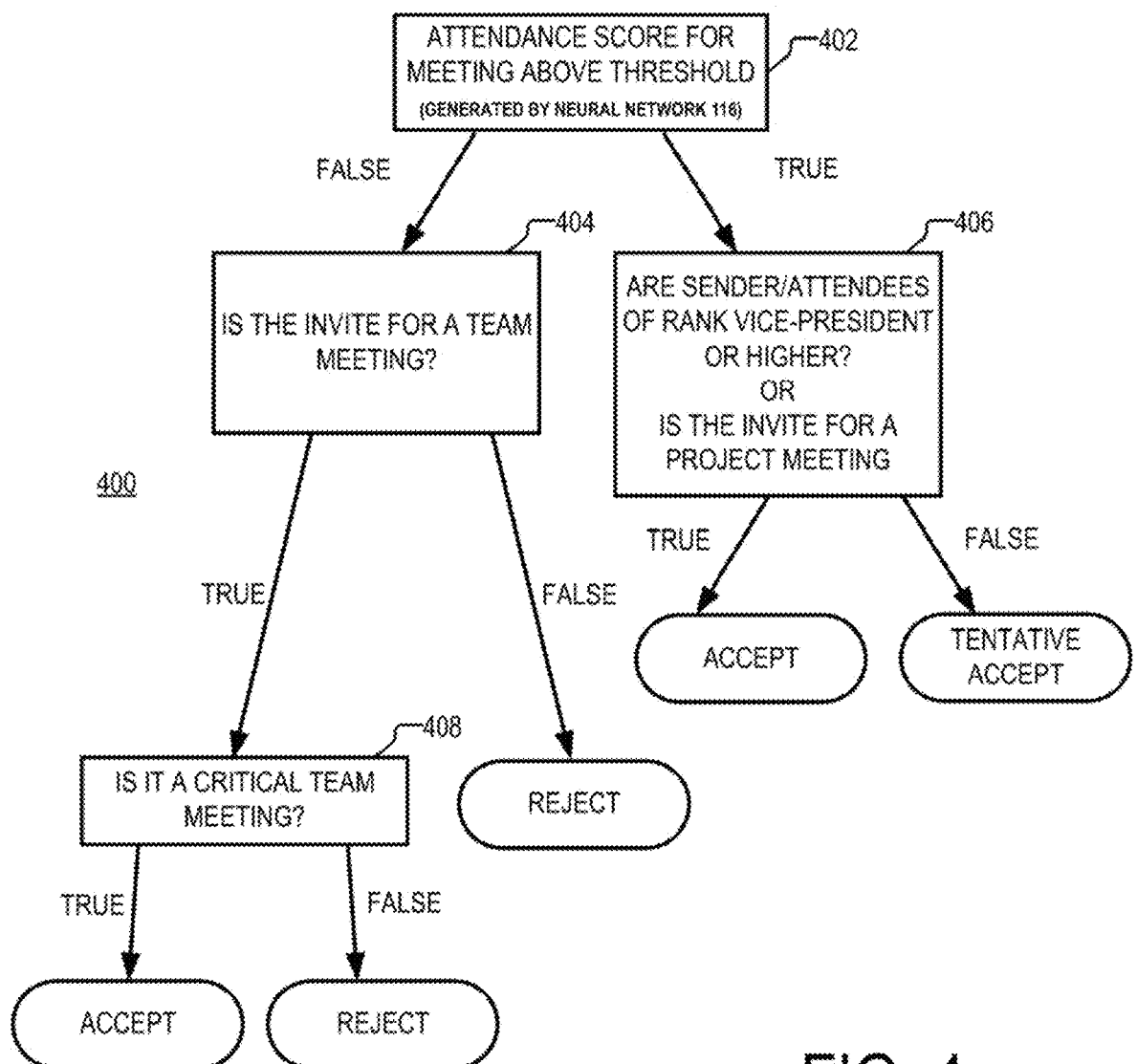
FIG. 4 is a flowchart of an example of a decision tree, according to aspects of the disclosure.

FIG. 4 is a diagram of an example of a decision tree 400 that is used by the decision engine 117 to determine a response to an incoming teleconference invite. The decision tree includes preconditions 402-408. Precondition 402 involves comparing an attendance score for the invite against a threshold. The attendance score may be generated by the neural network 116. If the attendance score is greater than a threshold, precondition 402 evaluates to TRUE. Otherwise, if the attendance score is less than or equal to the threshold, precondition 402 evaluates to FALSE. Precondition 404 involves detecting whether the invite is for a team meeting. If the invite is for a team meeting, precondition 404 evaluates to TRUE. Otherwise, if the invite is not for a team meeting, precondition 404 evaluates to FALSE. A team meeting may be a "routinely scheduled meeting, in which no upper management takes part, and which may not be critical to attend."Precondition 404 evaluates: (i) whether the sender of the invite and/or any of the invited attendees is a vice-president or higher in a company, and (ii) whether the invite is for a project meeting. If the invite is for a project meeting or the sender or an invited attendee is a vice president, precondition 406 evaluates to TRUE. Otherwise, precondition 406 evaluates to FALSE. Precondition 408 involves detecting whether the invite is for a critical team meeting. If the invite is for a critical team meeting, precondition 408 evaluates to TRUE. Otherwise, if the invite is not for a critical team meeting, precondition 408 evaluates to FALSE.

Decision tree 400 indicates that the decision engine 117 is configured to generate a response accepting the invite when preconditions 402 and 406 evaluate to TRUE. Decision tree 400 further indicates that the decision engine 117 is configured to generate a response tentatively accepting the invite when precondition 402 evaluates to TRUE and precondition 406 evaluates to FALSE. Decision tree 400 further indicates that the decision engine 117 is configured to generate a response rejecting the invite when preconditions 402 and 404 evaluate to FALSE. Decision tree 400 further indicates that the decision engine 117 is configured to generate a response accepting the invite when precondition 402 evaluates to FALSE and preconditions 404 and 408 evaluate to TRUE. Decision tree 400 further indicates that the decision engine 117 is configured to generate a response rejecting the invite when precondition 404 evaluates to TRUE and preconditions 402 and 408 evaluate to FALSE.

FIG. 5 is a schematic diagram illustrating examples of context information that may be associated with an invite 500. In the example of FIG. 5, the invite 500 is for a teleconference. The invite 500 may be associated with a plurality of fields. Field 502 may include an identifier of the invite. Field 503 may identify the date and time of the teleconference. Field 504 may include an identifier of an application associated with the invite. According to the present disclosure, an application associated with an invite for a teleconference is at least one of: (i) an application that is intended to be used to conduct the teleconference, (ii) an application that is identified by the invite, and/or (iii) an application whose protocol the invite is formatted in accordance with. Field 506 may include an indication of a modality of the teleconference. In the present example, field 506 indicates that the teleconference is going to be conducted via voice and video. Field 508 may identify a type of a meeting, which the teleconference is going to be used to conduct. In the present example, field 508 indicates that the meeting is a team meeting. Field 510 may identify the subject of the teleconference. In the present example, field 510 indicates that the teleconference is being scheduled to discuss the "planning of a yearly conference." Field 512 may identify the sender of the meeting. Field 514 identifies the people who are invited to attend the meeting. Field 514 may identify an agenda for the meeting. The agenda for the meeting may include free-form/unstructured text that describes one or more of the purpose of the meeting, the subject of the meeting, and/or any other suitable information concerning the meeting. Field 518 may include one or more credentials for joining the teleconference, such as a passcode or a user ID. Field 520 may include a link for joining the teleconference.

In some implementations, the information shown in FIG. 5 may be part of the invite 500, and it may be received with the invite 500. In some implementations, one or more of the information items shown in FIG. 5 may be retrieved from the body or attachment of an email that is associated with the invite 500. In some implementations, one or more of the information items shown in FIG. 5 may be generated (e.g., by the meeting assistant 112) by using Natural Language Processing (NLP) to extract information from the body or attachment of an email that is associated with the invite 500. In some implementations, one or more of the information items shown in FIG. 5 may be retrieved from the body of any document that is associated with the invite 500. In some implementations, one or more of the information items shown in FIG. 5 may be generated (e.g., by the meeting assistant 112) by using Natural Language Processing to extract information from any document that is associated with the invite 500. According to one example, an email or document is associated with an invite if it is sent to (or authored by) all (or at least one or more) of the participants in the teleconference session that is associated with the invite. Additionally or alternatively, a document may be associated with an invite if it is attached to the invite.

FIG. 6 is a diagram of a user interface 600 for displaying a proposed response that is generated by the meeting assistant 112 in response to the invite 500. In the present example, the user interface 600 includes a pane 602 that includes an indication 604 of the response, and a button 606.

According to the present example, pressing the button 606 causes the application associated with the invite 500 to transmit the response to the sender of the invite 500. In some implementations, the user interface 600 may be displayed by the meeting assistant 112. In such implementations, when the button 606 is pressed, the meeting assistant 112 may place one or more API calls to the application associated with the invite 500, which would cause the application to transmit the response. Alternatively, in some implementations, the user interface 600 may be displayed by the application associated with the invite 500, in response to an API call that is placed by the meeting assistant 112. In some implementations, the user may modify the response before pressing the button 606. In such implementations, a record of the modification may be retained by the computing device 100 and subsequently used by the trainer 118 when training the neural network 116.

Figure 7:
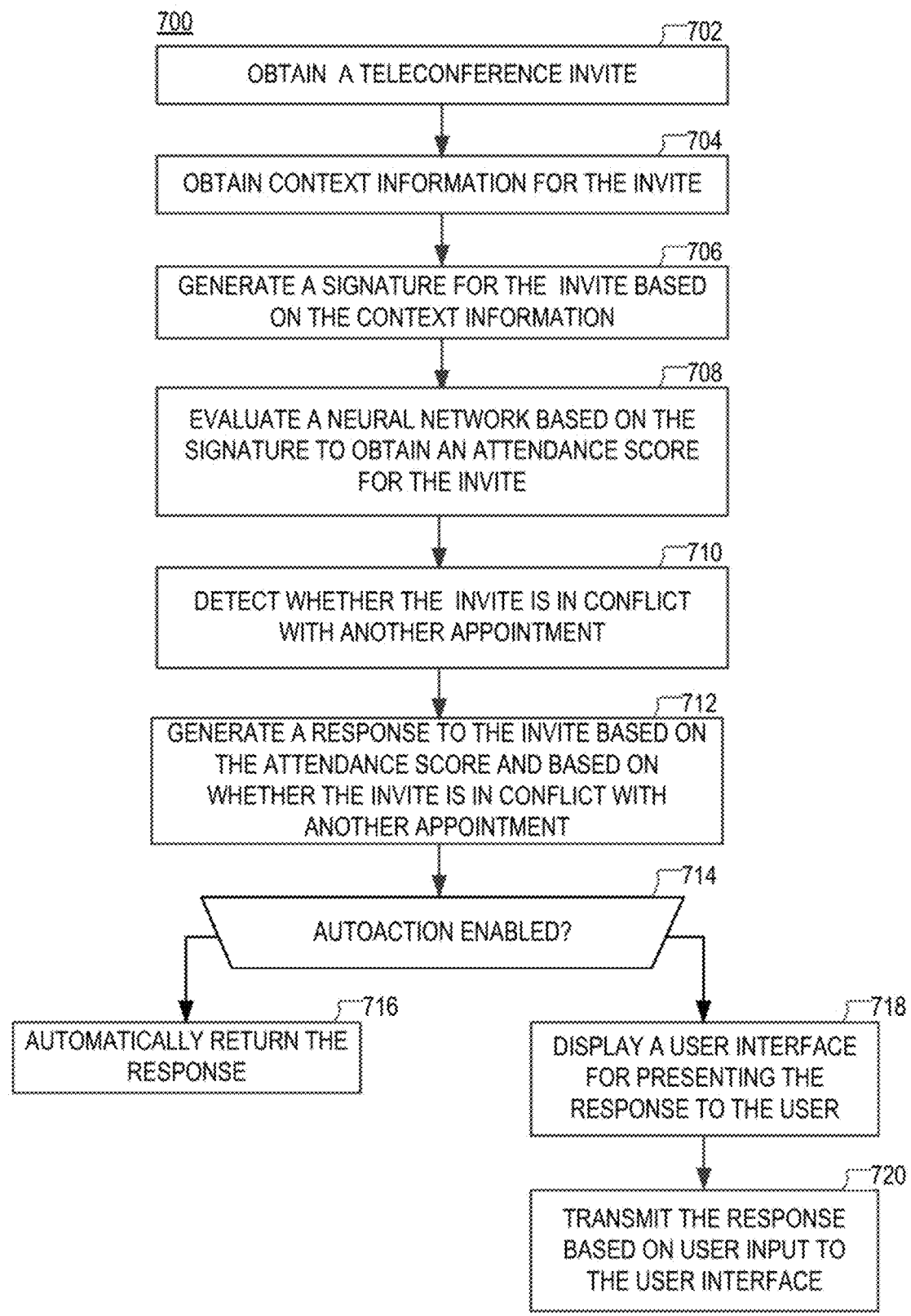
FIG. 7 is a flowchart of an example of a process, according to aspects of the disclosure.

FIG. 7 is a flowchart of an example of a process 700, according to aspects of the disclosure.

At step 702, the meeting assistant 112 obtains an invite for a teleconference that is received at the computing device 100. The invite may be the same or similar to the invite 500, which is discussed above with respect to FIG. 5. In some implementations, the invite 500 may be provided to the meeting assistant 112 by the application, which the invite is associated with (e.g., see field 516 in FIG. 5). Alternatively, in some implantations, the invite may be intercepted and provided to the meeting assistant by the operating system in which the meeting assistant 112 and application are executing.

At step 704, the meeting assistant obtains context information for the meeting invite. The obtained context information may include any of the information discussed above with respect to FIGS. 3 and 5. The context information may include one or more of an agenda for the invite, time of the invite, identifiers of the attendees in the teleconference, identifiers of the ranks of any of the attendees in the teleconference, type of meeting which the teleconference is going to be used to conduct (e.g., a team meeting, a project meeting, a leaders' meeting, etc.), the rank within an organization of any of the participants in the teleconference, (e.g., senior scientist, product manager, vice president, executive officer, etc.), the affiliation of any of the participants with an organization, the affiliation of any of the participants with a specific division of the organization and/or any other suitable type of information. In some implementations, obtaining the context information may include building a graph for the invite, such as the LPG 300, and using the graph to retrieve the information. In some implementations, the context information may be retrieved from the expert data repository 134. In some implementations, the graph for the invite may be built in the expert data repository 134 and retrieved from the data repository by using the graph query interface 123.

At step 706, the meeting assistant generates a signature of the invite based on the context information (obtained at step 704). In some implementations, the signature may include a plurality of bits, wherein each bit corresponds to a different characteristic of the invite. For example, one of the bits may correspond to a first type of meeting—if the bit is set to '0' this may be an indication that the teleconference is not going to be used to conduct a team meeting, and if the bit is set to '1' this may be an indication that the teleconference is going to be used to conduct a team meeting. As another example, one of the bits may correspond to a second type of meeting—if the bit is set to '0' this may be an indication that the teleconference is not going to be used to conduct a project meeting, and if the bit is set to '1' this may be an indication that the teleconference is going to be used to conduct a project meeting. As another example, one of the bits may correspond to the rank of at least one of the participants within a company—if the bit is set to '0' this may be an indication that none of the participants in the teleconference has a rank of vice president or higher, and if the bit is set to '1' this may be an indication that at least one of the participants has a rank of vice president or higher. As another example, one of the bits may correspond to an affiliation of the participants with a specific division of the company—if the bit is set to '0' this may be an indication that none of the participants is a member of the division, and if the bit is set to '1' this may be an indication that at least one of the participants is a member of the division.

Additionally or alternatively, in some implementations, the signature may be generated based on a text message associated with the invite. The text message may be the same or similar to the agenda contained in field 516, which is discussed above with respect to FIG. 5. In such implementations, the signature may include a plurality of bits. Each bit in the signature may correspond to a particular word. When the bit is set to '1', this may be an indication that the word is part of the message. When the bit is set to '0', this may be an indication that the word is absent from the message. In some implementations, the signature may be generated after word substation is performed or after words with low informational content are removed. In some implementations, the signature may be generated by using word2vec or another similar technique. It will be understood that the present disclosure is not limited to any specific method for generating the signature.

At step 708, the meeting assistant 112 classifies the signature with the neural network 116. Specifically, the meeting assistant 112 evaluates the neural network 116 based on the signature to obtain an attendance score for the signature (and the invite).

At step 710, the meeting assistant 112 detects whether the invite is in conflict with another appointment of the user. For example, the meeting assistant 112 may interact with the calendar applications 120 to determine if the user has already a scheduled appointment on the day and time of the invite.

At step 712, the meeting assistant 112 generates a response based on the attendance score and/or based on the presence of a conflicting appointment. For example, in some implementations, the meeting assistant 112 may compare the attendance score to a predetermined threshold, and if the attendance score exceeds the threshold, the meeting assistant 112 may generate a response accepting the invite. Otherwise, if the attendance score is below the threshold, the meeting assistant 112 may generate a response declining the invite. Additionally or alternatively, in some implementations, the meeting assistant 112 may generate the response by executing a decision tree, such as the decision tree 400, which is discussed above with respect to FIG. 4. Additionally or alternatively, in some implementations, meeting assistant may generate a response declining the invite, if the time of the invite overlaps fully with another appointment. Additionally or alternatively, in some implementations, when the invite overlaps partially with another appointment, the meeting assistant may generate a response indicating that the user will join the communications session only for a limited time period (e.g., for the first or last 30 minutes of the teleconference).

At step 714, the meeting assistant 112 may detect if autoaction is enabled. Detecting whether autoaction is enabled may include detecting whether a binary configuration setting of the meeting assistant is set to '1' or '0'. If the setting is set to '1', the meeting assistant 112 may determine that autoaction is enabled and the process 700 may proceed to step 716. Otherwise, if the setting is equal to '0', the meeting assistant 112 may determine that autoaction is disabled, the process 700 may proceed to step 718.

At step 716, the meeting assistant automatically transmits the generated response to the sender of the invite. Transmitting the response automatically may include transmitting the response without the user providing any input triggering the transmission of the response after the response is generated.

At step 718, the meeting assistant 112 displays a user interface for presenting the response to the user. The user interface may be the same or similar to the user interface 600, which is discussed above with respect to FIG. 6. The user interface may include an indication of the response (generated at step 712).

At step 720, the meeting assistant 112 transmits the response to the sender of the invite. The response is transmitted in response to user input that is received via the interface. As discussed above with respect to FIG. 6, the user input may be the press of a button for triggering transmission of the invite.

Figure 8:
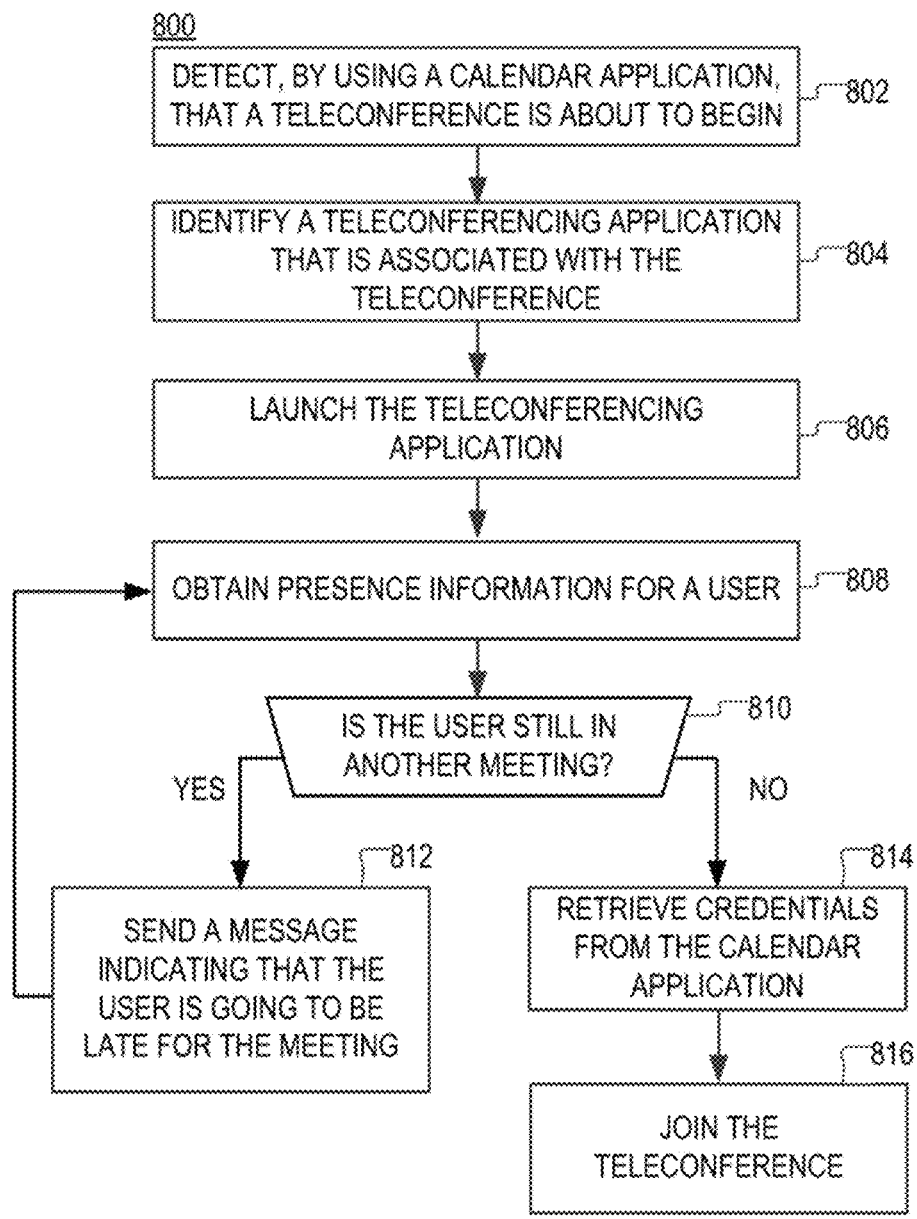
FIG. 8 is a flowchart of an example of a process, according to aspects of the disclosure.

FIG. 8 is a flowchart of an example of a process 800, according to aspects of the disclosure. At step 802, the meeting assistant 112 detects that a teleconference is scheduled to begin. For example, the meeting assistant 112 may detect an event that is generated by one of the calendar applications 120, which indicates that the time for the teleconference has arrived. At step 804, the meeting assistant 112 identifies a teleconferencing application that is associated with the teleconference. At step 806, the meeting assistant 112 launches the teleconferencing application on the computing device 100 (provided that it is not already running). At step 808, the meeting assistant 112 obtains presence information for the user.

At step 810, the meeting assistant 112 detects, based on the presence information, whether the user is not available to join the teleconference. In some implementations, the meeting assistant 112 may detect, based on the presence information, if the user is still in another meeting. However, the present disclosure is not limited to using the presence information to detect any specific condition that makes the user unable to join the teleconference. If the user is not available, the process 800 proceeds to step 812. Otherwise, the process 800 proceeds to step 814.

At step 812, the meeting assistant 112 sends a text message indicating the user is not available. In some implementations, the text message may indicate that the user is going to be late for the meeting. However, the present disclosure is not limited to any specific type of contents being included in the text message. In some implementations, the message may be sent to a text chat that is associated with the teleconference. The chat that is associated with the teleconference may include a text chatroom that is: (i) instantiated when the teleconference is started, and/or (ii) is restricted to the participants in the teleconference. In some implementations, the meeting assistant 112 may place an API call to the teleconferencing application, which when executed by the teleconferencing application, causes the teleconferencing application to send the message.

At step 814, the meeting assistant 112 retrieves one or more credentials associated with the teleconference from one of calendar applications 120, in which an appointment associated with the teleconference is stored. The retrieved credentials may include a passcode, a user ID, and/or any other suitable type of credential.

At step 816, the meeting assistant joins the teleconference by using the retrieved credentials. Joining the teleconference may include activating a link, which is stored in a calendar appointment associated with the teleconference. Alternatively, joining the teleconference may include placing an API call to the teleconferencing application which causes the teleconferencing application to join the teleconference.

Although processes 700-800 (shown in FIGS. 7-8) are performed the meeting assistant 112, alternative implementations are possible in which the processes 700-800 are performed by one of applications 122. In such implementations, the process 700-800 may be used to respond to invites that are specific only to the application implementing the processes 700-800. Although the discussion of FIGS. 1-8 is presented in the context of teleconference invites, it will be understood that the techniques discussed throughout the disclosure can be used to respond to invites for any communication session, such as invites for a voice call, invites for a text chat, etc. As used herein, the phrase "response indicating whether a user of the computing device accepts or rejects the invite" may refer to a response accepting the invite, a response tentatively accepting the invite, a response indicating that the user will attend only a part of a communications session of the invite, a response rejecting the invite, a response tentatively rejecting the invite, and/or any other suitable type of response that is indicative of the user expects to attend a communications session that is associated with the invite. The phrase "participant in a teleconference" as used in the context of an invite to the teleconference may refer to a person who has been invited to attend the conference, but has not necessarily accepted the invitation.

FIGS. 1-8 provide are provided as an example only. At least some of the steps discussed with respect to FIGS. 7-8 may be performed in parallel, in a different order, or altogether omitted. Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary.*. Likewise, additional steps may be included in such methods, and certain steps may be omitted or combined, in methods consistent with various embodiments.

Also, for purposes of this description, the terms "couple," "coupling," "coupled,""connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a computing device, comprising:
receiving an invite for a communications session;
obtaining context information associated with the invite;
generating a signature for the invite based on the context information;
generating an attendance score for the invite by evaluating a neural network based on the signature for the invite, the attendance score being an estimate of a degree of importance of attending the communications session;
generating a response to the invite based on the attendance score, the response indicating whether a user of the computing device accepts or rejects the invite; and
transmitting the response to a sender of the invite.

2. The method of claim 1, wherein the response is generated by evaluating a decision tree based on: (i) the attendance score, (ii) a type of the communications session, and (iii) information about one or more participants in the communications session.

3. The method of claim 1, wherein the context information includes one or more of: an indication of a rank within a company of at least one invited participant in the communications session, an indication of a subject of the communications session, and an indication of a type of meeting, which the communications session is going to be used to conduct.

4. The method of claim 1, wherein the response is generated and transmitted automatically, without the user providing any input triggering transmission of the response after the response is generated.

5. The method of claim 1, wherein generating the response includes generating a first response that accepts the invite when the attendance score satisfies a predetermined condition and generating a second response that rejects the invite when the attendance score fails to satisfy the predetermined condition.

6. The method of claim 1, wherein obtaining context information for the invite includes retrieving the context information from a database that maps relationships between different entities associated with the communications session, the entities including: (i) participants in the communications session, (ii) an organization and divisions of the organization, and (iii) communications session attributes.

7. The method of claim 1, further comprising:
detecting that the communications session is scheduled to begin;
identifying a communications application that is associated with the invite;
detecting whether the user is participating in another communications session;
when the user is participating in another communications session, causing the communications application to transmit an indication that the user is currently unable to join the communications session; and when the user is not participating in another communications session, causing the communications application to join the communications session.

8. A system, comprising:

a memory; and at least one processor that is operatively coupled to the memory, the at least one processor being configured to perform the operations of:

receiving an invite for a communications session;

obtaining context information associated with the invite;

generating a signature of the invite based on the context information;

generating an attendance score for the invite by evaluating a neural network based on the signature of the invite, the attendance score being an estimate of a degree of importance of attending the communications session;

generating a response to the invite based on the attendance score, the response indicating whether a user accepts or rejects the invite; and transmitting the response to a sender of the invite.

9. The system of claim 8, wherein the response is generated by evaluating a decision tree based on: (i) the attendance score, (ii) a type of the communications session, and (iii) information about one or more participants in the communications session.

10. The system of claim 8, wherein the context information includes one or more of: an indication of a rank within a company of at least one invited participant in the communications session, an indication of a subject of the communications session, and an indication of a type of meeting, which the communications session is going to be used to conduct.

11. The system of claim 8, wherein the response is generated and transmitted automatically, without the user providing any input triggering transmission of the response after the response is generated.

12. The system of claim 8, wherein generating the response includes generating a first response that accepts the invite when the attendance score satisfies a predetermined condition and generating a second response that rejects the invite when the attendance score fails to satisfy the predetermined condition.

13. The system of claim 8, wherein obtaining context information for the invite includes retrieving the context information from a database that maps relationships between different entities associated with the communications session, the entities including: (i) participants in the communications session, (ii) an organization and divisions of the organization, and (iii) communications session attributes.

14. The system of claim 8, wherein the at least one processor is further configured to perform the operations of:

detecting that the communications session is scheduled to begin;

identifying a communications application that is associated with the invite;

detecting whether the user is participating in another communications session;

when the user is participating in another communications session, causing the communications application to transmit an indication that the user is currently unable to join the communications session; and when the user is not participating in another communications session, causing the communications application to join the communications session.

15. A non-transitory computer-readable medium storing one or more processor-executable instructions, which when executed by at least one processor of a computing device cause the at least one processor to perform the operations of:

receiving an invite for a communications session;

obtaining context information associated with the invite;

generating a signature of the invite based on the context information;

generating an attendance score for the invite by evaluating a neural network based on the signature of the invite, the attendance score being an estimate of a degree of importance of attending the communications session;

generating a response to the invite based on the attendance score, the response indicating whether a user of the computing device accepts or rejects the invite; and transmitting the response to a sender of the invite.

16. The non-transitory computer-readable medium of claim 15, wherein the response is generated by evaluating a decision tree based on: (i) the attendance score, (ii) a type of the communications session, and (iii) information about one or more participants in the communications session.

17. The non-transitory computer-readable medium of claim 15, wherein the context information includes one or more of: an indication of a rank within a company of at least one invited participant in the communications session, an indication of a subject of the communications session, and an indication of a type of meeting, which the communications session is going to be used to conduct.

18. The non-transitory computer-readable medium of claim 15, wherein the response is generated and transmitted automatically, without the user providing any input triggering transmission of the response after the response is generated.

19. The non-transitory computer-readable medium of claim 15, wherein generating the response includes generating a first response that accepts the invite when the attendance score satisfies a predetermined condition and generating a second response that rejects the invite when the attendance score fails to satisfy the predetermined condition.

20. The non-transitory computer-readable medium of claim 15, wherein obtaining context information for the invite includes retrieving the context information from a database that maps relationships between different entities associated with the communications session, the entities including: (i) participants in the communications session, (ii) an organization and divisions of the organization, and (iii) communications session attributes.

* * * * *